(12) United States Patent
Boulton et al.

(10) Patent No.: US 10,114,454 B2
(45) Date of Patent: Oct. 30, 2018

(54) VELOCITY AND DEPTH AWARE REPROJECTION

(71) Applicant: MICROSOFT TECHNOLOGY LICENSING, LLC, Redmond, WA (US)

(72) Inventors: Michael George Boulton, Seattle, WA (US); Ashraf Ayman Michail, Kirkland, WA (US); Gerhard Albert Schneider, Bellevue, WA (US); Yang You, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 111 days.

(21) Appl. No.: 15/407,833

(22) Filed: Jan. 17, 2017

(65) Prior Publication Data
US 2017/0374343 A1    Dec. 28, 2017

Related U.S. Application Data (63) Continuation-in-part of application No. 15/190,085, filed on Jun. 22, 2016.

(51) Int. Cl.
G06F 3/01    (2006.01)

(52) U.S. Cl.
CPC ............................ G06F 3/012 (2013.01)

(58) Field of Classification Search
CPC .................................................. G06F 3/012
See application file for complete search history.

(56) References Cited

U.S. PATENT DOCUMENTS 3,778,130 A    12/1973 Waters
5,933,125 A    8/1999 Fernie et al.
(Continued)

FOREIGN PATENT DOCUMENTS

EP    3051525 A1    8/2016

OTHER PUBLICATIONS

Abrash, Michael, "Why virtual isn't real to your brain: judder", Published on: Jun. 20, 2013 Available at: http://blogs.valvesoftware.com/abrash/why-virtual-isnt-real-to-your-brain-judder/.
(Continued)

*Primary Examiner* — James Pontius
(74) *Attorney, Agent, or Firm* — Alleman Hall Creasman & Tuttle LLP (57) ABSTRACT

In various embodiments, methods and systems for reprojecting images based on a velocity depth late stage reprojection process are provided. A reprojection engine supports reprojecting images based on an optimized late stage reprojection process that is performed based on both depth data and velocity data. Image data and corresponding depth and velocity data of the image data is received. A determination of an adjustment to be made to the image is made. The determination is made based on motion data, the depth data and the velocity data. The motion data corresponds to a device associated with displaying the image data. The velocity data supports determining calculated correction distances for portions of the image data. The image data is adjusted based on the determined adjustment. Adjusting the image data is based on integrating depth-data-based translation and velocity-data-based motion correction, into a single pass implementation, to adjust the image data.

20 Claims, 9 Drawing Sheets

(56) References Cited

U.S. PATENT DOCUMENTS

| | | | |
|---|---|---|---|
| 7,312,766 B1 | 12/2007 | Edwards | |
| 2012/0069205 A1* | 3/2012 | Dowski, Jr. | G02B 27/0075 |
| | | | 348/208.99 |
| 2012/0195471 A1* | 8/2012 | Newcombe | G06T 7/194 |
| | | | 382/106 |
| 2013/0343610 A1* | 12/2013 | Dal Mutto | G06K 9/00355 |
| | | | 382/103 |
| 2014/0363100 A1* | 12/2014 | Usikov | G06T 7/20 |
| | | | 382/285 |
| 2015/0002542 A1 | 1/2015 | Chan et al. | |
| 2015/0363976 A1 | 12/2015 | Henson | |
| 2015/0379772 A1 | 12/2015 | Hoffman | |
| 2017/0024900 A1* | 1/2017 | Geiger | G06T 7/579 |

OTHER PUBLICATIONS

Abrash, Michael, "Down the VR rabbit hole: Fixing judder", Published on: Jul. 26, 2013 Available at: http://blogs.valvesoftware.com/abrash/down-the-vr-rabbit-hole-fixing-judder/.

Pelot, Anthony M., "Dynamic Blanking for Virtual Reality Image Displacement", In Virtual Reality, Retrieved on: Aug. 19, 2016, 3 pages.

Kim, et al., "Fast generation of video holograms of three dimensional moving objects using a motion compensation-based novel look-up table", In Journal of Optics Express, vol. 21, Issue 9, May 6, 2013, 17 pages.

Goradia, et al., "A Review Paper on Oculus Rift & Project Morpheus", In International Journal of Current Engineering and Technology, vol. 4, Issue 5, Oct. 2014, pp. 3196-3200.

Chuptys, et al., "Head Mounted Displays", Retrieved on: Aug. 19, 2016 Available at: http://www.student.kuleuven.be/~s0214423/CapSel1314/hmds004.pdf.

"Rendering in DirectX", Retrieved on: Aug. 19, 2016 Available at: https://developer.microsoft.com/en-us/windows/holographic/rendering_in_directx.

* cited by examiner

VELOCITY AND DEPTH AWARE REPROJECTION

CROSS-REFERENCE TO RELATED APPLICATIONS

This application is a continuation-in-part of, and claims benefit to, U.S. patent application Ser. No. 15/190,085 filed Jun. 22, 2016, entitled "DEPTH-AWARE REPROJECTION," which is incorporated herein by reference in its entirety.

BACKGROUND

Computing systems can support the manipulation and display of computer images. In particular, a graphical processing unit (or visual processing unit) can be operated as a specialized mechanism for generating images for output to a display. Graphical processing units can support generating images for display on display devices. A display device can specifically support displaying virtual reality images or environments, including augmented reality images or environments. With virtual images, including augmented reality images, additional challenges are involved when generating these virtual images, where the virtual images have to simulate a user's physical presence in the virtual environment. As such, a comprehensive system addressing such challenges, associated with rendering virtual images, can improve user experiences in virtual environments.

SUMMARY

Embodiments described herein provide methods and systems for reprojecting images based on velocity and depth late stage reprojection. A display system includes a reprojection engine that supports reprojecting images based on an optimized late stage reprojection process that is performed based on both depth data and velocity data. In this regard, the display system can support velocity depth late stage reprojection (VDLSR). By integrating velocity data of a virtual image into a depth late stage reprojection process, the reprojection engine further compensates for velocity-based motion, of the virtual image based on a velocity relative to the user, in conjunction, with rotational and translation movement associated with an HMD displaying the virtual image. In operation, image data and corresponding depth data and velocity data of the image data is received. A determination of an adjustment to be made to the image is made. The determination is made based on motion data, the depth data and the velocity data. The motion data corresponds to a device associated with displaying the image data. The velocity data supports determining calculated correction distances for portions of the image data. The image data is adjusted based on the determined adjustment. The adjustment made to the image data is based on integrating depth-data-based translation and velocity-data-based correction, into a single pass implementation, to adjust the image data.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Virtual images that are projected in virtual environments can include portions (e.g., non-stationary objects) of the virtual image that are moving or traveling with a relative velocity to a user of the HMD. Because the virtual images are moving with a velocity relative to the user, a conventional display system cannot render and cause display of the image without some degradation of the intended virtual image quality. For example, the virtual image motion may be rendered unevenly and include judder and other artifacts. As such, a comprehensive display system can improve user experiences in virtual environments where the virtual images are moving with a velocity relative the user.

Embodiments of the present invention provide simple and efficient methods and systems for reprojection images for display in virtual environments. At a high level, a display system includes a reprojection engine that supports reprojecting images based on an optimized late stage reprojection process that is performed based on both depth data and velocity data. In this regard, the display system can support velocity depth late stage reprojection (VDLSR). By integrating velocity data of a virtual image into a depth late stage reprojection process, the reprojection engine further compensates for velocity-based motion, of the virtual image based on a velocity relative to the user, in conjunction, with rotational and translation movement associated with an HMD displaying the virtual image. In operation, image data and corresponding depth data and velocity data of the image data is received. A determination of an adjustment to be made to the image is made. The determination is made based on motion data, the depth data and the velocity data. The motion data corresponds to a device associated with displaying the image data. The velocity data supports determining calculated correction distances for portions of the image data. The image data is adjusted based on the determined adjustment. The adjustment made to the image data is based on integrating depth-data-based translation and velocity-data-based correction, into a single pass implementation, to adjust the image data.

By way of background, virtual reality display technology includes generating and displaying images associated with one or more virtual objects within a virtual reality environment. Advantageously, generating and displaying the images can be at a frame rate that is greater than a rendering frame rate for improving virtual object stability. Late stage reprojection specifically can refer to displaying images based on late stage graphical adjustments of a pre-rendered image (i.e., forward predicted images that are rendered and displayed) in order to incorporate high frequency of pose estimates of a display device (e.g., a head mounted display device (HMD)). The user can be associated with a device and display supporting the rendering and display of the virtual images. For example, the user may be wearing the HMD that supports displaying virtual images in virtual environments including augmented reality environments. Late stage reprojection as employed herein is described in U.S. patent application Ser. No. 13/951,351 entitled "LATE STAGE REPROJECTION," which is incorporated herein by reference in its entirety.

Late stage reprojection (LSR) addresses a basic problem of the impact of head movement of a user when the user is wearing an HMD that supports rendering and displaying virtual reality images (including augmented reality images). The problem results from the change in a pose (i.e., position and orientation) of the HMD during the delay time period between when an image is rendered by the GPU and when the image is communicated for display. Basically, the image is rendered and displayed based on a pose further back in time. The resulting displayed image appears lagging relative to a new pose of the user. Several different LSR techniques exist and most fundamentally operate to receive an updated pose for the HMD, the updated pose is used to re-render the pre-rendered image by adjusting the pre-rendered image.

Depth late stage reprojection (DLSR) is a variation of traditional LSR techniques, where DLSR implements a depth buffer (e.g., a blurred depth map) for better results in that the blurred depth map supports translational corrections to pre-rendered image data prior to display using an iterative processes involving the blurred depth map for the image data. Briefly, a corrected color of each pixel in a frame buffer of stored rendered image data may be determined by a virtual ray cast from the reprojected position of a rendering camera of the display device to a location where the ray intersects the blurred depth map. A pixel at that location in the blurred depth map then may be used to correct the color at the pixel at which the virtual ray intersects the frame buffer. DLSR allows the stabilization of reprojected virtual images at varying depths without the use of a full-resolution depth map, and may be operated using relatively low power consumption and memory bandwidth, making the process suitable for portable devices. Further, as described in more detail below, the disclosed reprojection methods may be configured to converge in a deterministic time per pixel. This may be advantageous in portable devices and/or special-purpose hardware, as no matter the complexity of the original rendered image, the time and power required to reproject the image have fixed upper bounds.

DLSR for static geometry images supports generating improved displayed virtual reality images. However, virtual environments can have portions of the virtual image that are non-stationary, in that the portions (e.g., virtual objects) of the virtual image are moving at a velocity relative to the user of the HMD. For example, in a virtual scene, a ball may be moving within the scene. With current techniques, a position of the ball in a virtual image can be captured in a first pose (i.e., position and orientation) of the HMD and rendered based on the first pose. The ball is then re-rendered based on a current or second pose (e.g., an updated pose) of the HMD; however, the ball is not further re-rendered and corrected for display based on a distance moved as a function of velocity at which the ball is moving, relative to the user. As such, distance the ball travels between first pose and the updated pose is not properly captured in the display causing uneven motion of the ball in display of the virtual image.

VDLSR addresses the problem of head movement in combination with the problem of virtual objects in a virtual image that are moving with a velocity relative to the user. The discrepancy of virtual object movement is accounted for to correctly display moving virtual reality images. Advantageously, the discrepancy of the virtual object movement is determined and corrected in a single pass in combination with translation and/or rotational motion, that are part of a DSLR algorithm. By way of example, a virtual reality image includes stationary and non-stationary objects or portions of the virtual reality image. A non-stationary object can be a ball moving from left to right direction at a velocity relative to the user. Velocity data can be captured for the virtual image. For example, the velocity of the image is captured in a velocity buffer. Stationary objects may not have any velocity data while non-stationary object have velocity data. Velocity data (e.g., distance moved as a function of time) for non-stationary objects can be used to further correct the position in a subsequent frame for non-stationary objects. The corrected position determined based on a change in time (e.g., delta) between a first frame (n−1) and a second frame (n). A calculated distance of how far a non-stationary object would have moved over the delta would indicate a distance of how much to correct the non-stationary object. In one embodiment, each pixel of the image is associated with a velocity vector and stored in the velocity buffer (i.e., per-pixel velocity).

As discussed earlier, the velocity buffer can operate in combination with the color buffer and depth buffer of a DSLR implementation. In DLSR an image that was rendered in a previous frame (n−1) can be used (e.g., the point of view of the image) to resolve the depth of the image to be projected to frame (n). An iterative process is used to determine the new depth (e.g., a depth convergence point) and ultimately where, based on depth, to project the image in frame (n). Upon determining the depth, the color buffer can be retrieved from the previous frame and super-imposed on the image in frame (n). Because the DLSR works on an iterative process, the VDLSR process can operate to perform an integrated depth and velocity compensation step with each iterative process in trying to determine the convergence point indicating the new depth and corresponding new position for non-stationary objects.

In one exemplary embodiment, the display system supports a color buffer, depth buffer and a velocity buffer. In particular, the velocity buffer may contain per-pixel velocity data, which can be quantized and stored. Leading silhouettes within the velocity buffer can be extended along the direction of motion by one step. During VDLSR, at each iteration of the process for re-rendering the virtual image for display, a set of operations are performed using the color buffer, depth buffer, and velocity buffer to generate the virtual image for display. For example, the virtual buffer is sampled for velocity data, where the velocity data is multiplied by the inter-frame time step, and a pre-rendered position is transformed by the distance in the opposite direction. The silhouette extension pass can be implemented by rendering all visible, non-stationary objects again into the velocity buffer at the forward interpolation position. By integrating velocity data into the DLSR process into a single pass implementation, virtual object motion is corrected in conjunction with head motion.

In an exemplary embodiment, the VDLSR is implemented based on intra-frame velocity interpolation. By way of example, a frame is associated with a predefined time period (e.g., 1/90th of a second). As such, the HMD updates the display at 90 fps. A first portion (e.g., 1/45th of a second) of the frame can be smaller than 1/90th of a second but still visible to the human eye. Intra-frame interpolation can include rendering frames during the first portion of the frame. In particular, when hardware cannot support rendering frames at 1/90th of a second, additional frames are interpolated at 1/45th of a second to make up for the hardware deficiency. In this regard, the VLDSR algorithm is may only be used to create the in-between frames at 1/45th. As such, the intra-frame velocity interpolation refers to a mode of VDLSR that supports creating in-between frames using the VDLSR algorithm. An alternative mode uses a synchronization interval for VDLSR frames at the predefined fps rate (e.g., VDLSR frames at 1/90th of a second).

Figure 2:
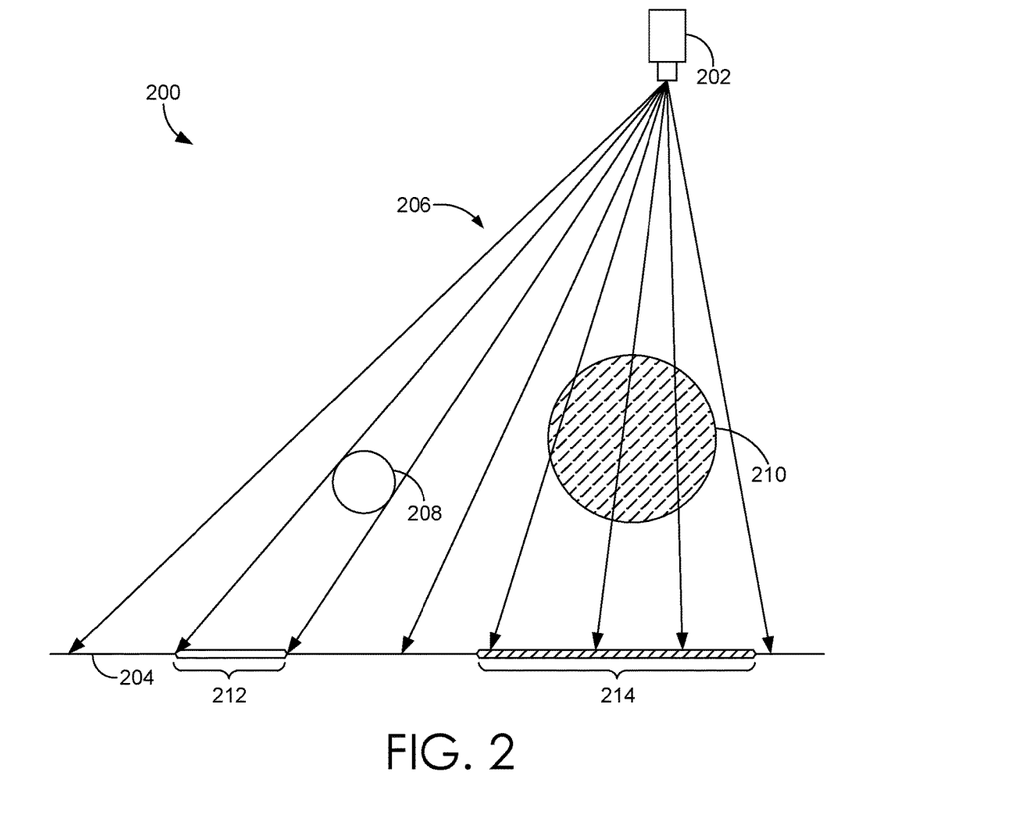
FIG. 2 is an illustration of an exemplary two-dimensional viewing frustum for an HMD, in accordance with embodiments of the present invention.

Turning to FIG. 2, image rendering and VDLSR examples are described herein in the context of 2D geometry for clarity. In 2D geometry, points in a 2D scene are mapped to one dimension. FIG. 2 schematically illustrates partial rendering of an example 2D scene 200 on a display device, where a portion of a frame buffer 204 is shown as a one-dimensional line, and a portion of a viewing frustum 206 (the field-of-view of camera 202) is represented by a fan of virtual rays. In 3D geometry, the frame buffer would be represented by a 2D plane, while the viewing frustum would be represented by an array of virtual rays. In FIG. 2, only a portion of the viewing frustum is shown for simplicity. 2D object 208 and 2D object 210 are shown as circles, representing examples of 2D objects within the 2D scene 200. The display device may render 2D objects 208 and 210 by coloring the pixels in frame buffer 204 which correspond to 2D objects 208 and 210. These pixels correspond to those that are touched by virtual rays cast from camera 202 and intersect each of 2D objects 208 and 210. For example, if 2D object 208 is a green object, then the GPU renders the pixels in frame buffer portion 212 as green, as virtual rays cast from camera 202 which intersect object 208 touch pixels within frame buffer portion 212. Likewise, if 2D object 210 is a red object, then the display device may render pixels in frame buffer portion 214 as red.

Figure 3:
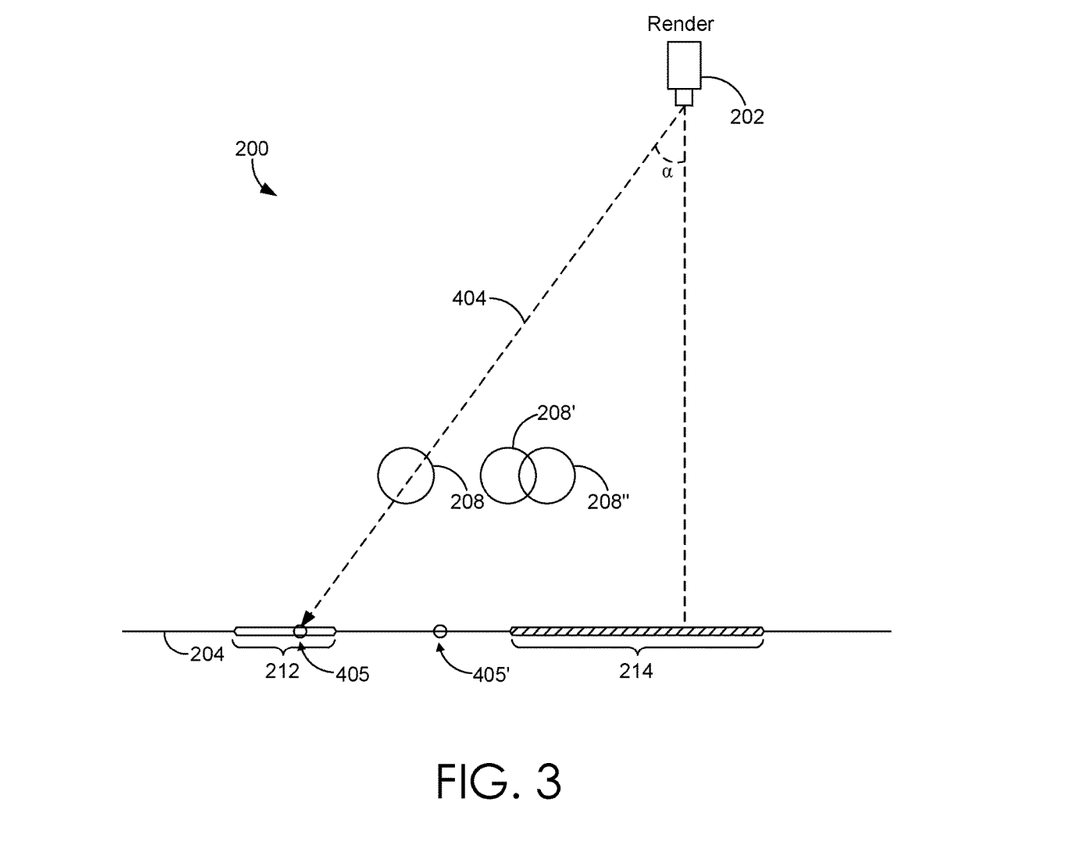
FIG. 3 is an illustration of an exemplary implementation of velocity depth late stage reprojection, in accordance with embodiments of the present invention.

As mentioned above, a brief amount of time may exist between rendering of a virtual object and display of the virtual object, within which movements of the display device and movement of the virtual object may affect the resulting displayed content. With reference to movement of the virtual object, each pixel in the frame buffer may be identified by the angle of a ray cast from the camera extending to that pixel in the frame buffer. FIG. 3 shows an example schematic illustrating a ray cast before virtually adjusting a position of rendering camera 202. As in FIG. 2, where 2D object 208 is a green object in the 2D scene, the pixel at 405 in frame buffer 204 is rendered as a green pixel because ray 404 cast from rendering camera 202 to frame buffer 204 at an angle α passes through 2D object 208. This is known to the display device because both the 2D geometry of the scene as well as the camera position are available to the display device.

However, determining the correct distance to display the 2D object 208 after reprojection due to movement of the 2D object 208 may be challenging, when the 2D object is associated with a velocity (e.g., velocity vector) relative to a user. For example, with DLSR, when determining a location of 2D object 208 pixel 405 based upon reprojection, the device may only have the frame buffer and a depth data for the image data available to help make the determination. The GPU merely translates frame buffer pixel 405 by an amount corresponding to the camera translation amount without velocity data, with the 2D object 208 moving only partially as shown in FIG. 3 as 2D object 208' with compensating the distance moved based on a velocity of the 2D object 208.

Thus, the examples disclosed herein may help to correct the issues of DLSR by utilizing velocity data to achieve depth-aware and velocity-aware late-stage reprojection. The use of velocity data in combination with DLSR to inform late-stage reprojection may help to reduce a computational burden of the reprojection process, and also may help to ensure that an iterative process to locate the intersection of the reprojected ray and blurred depth map converges to a suitable degree within a relatively small and consistent number of computation cycles. This may allow such an iterative process to be implemented deterministically. As such, based on embodiments described herein the GPU further samples frame buffer 204 for velocity data and determines the reprojected location as shown in FIG. 3 as 2D object 208" corresponding to pixel 405' and a ray 406 cast from reprojected camera extending to frame buffer 204.

Figure 4:
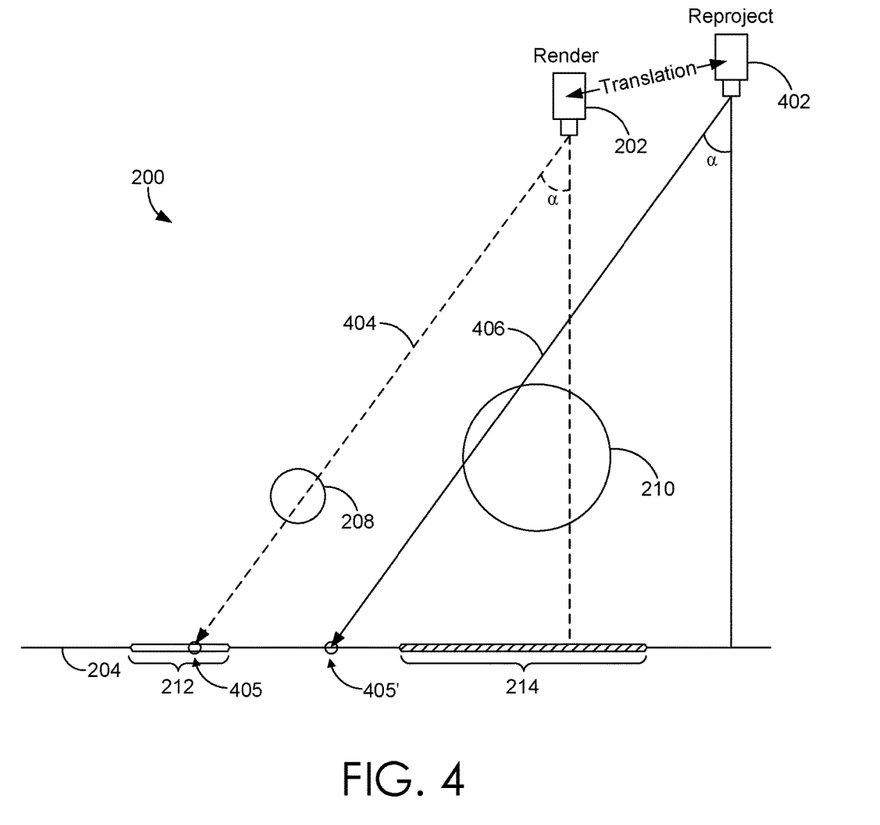
FIG. 4 is an illustration of exemplary ray casting for a pixel from a rendering camera position and a reprojected camera position, in accordance with embodiments of the present invention.

Turning to FIG. 4, FIG. 4 shows an example schematic illustrating a ray cast before and after virtually translating a position of rendering camera 202 to reprojected camera 402 using non-depth-aware and non-velocity aware reprojection techniques. As in FIG. 2, assuming no velocity data is associated with the virtual objects, where 2D object 208 is a green object in the 2D scene, the pixel at 405 in frame buffer 204 is rendered as a green pixel because ray 404 cast from rendering camera 202 to frame buffer 204 at an angle α passes through 2D object 208. This is known to the display device because both the 2D geometry of the scene as well as the camera position are available to the display device.

However, determining the correct pixel color to display after reprojection due to translation may be challenging. For example, when determining the color of a pixel based upon reprojection, the device may only have the frame buffer and a depth map for the image data available to help make the determination. In planar homography, the GPU merely translates frame buffer pixel 405 by an amount corresponding to the camera translation amount and the distance between the camera and the plane of the image, shown in FIG. 4 as pixel at 405'. As such, the GPU samples frame buffer 204 at pixel 405' and determines the reprojected color to be black, even though ray 406 cast from reprojected camera 302 extending to frame buffer 204 at angle α actually passes through 2D object 210, which is red and thus indicates that the pixel at 405' should be red. As such, planar homography may result in incorrect display of reprojected pixels due to the limited information available.

Thus, the examples disclosed herein may help to correct the issues of planar homography by utilizing a blurred depth map to achieve depth-aware late-stage reprojection that integrates with velocity-aware late stage reprojection. The use of a blurred depth map to inform late-stage reprojection may help to reduce a computational burden of the reprojection process, and also may help to ensure that an iterative process to locate the intersection of the reprojected ray and blurred depth map converges to a suitable degree within a relatively small and consistent number of computation cycles. This may allow such an iterative process to be implemented deterministically.

A blurred depth map may be obtained by reducing the resolution of an original depth map for the image data by a predetermined factor, and blurring the depth map via a convolution process. As one example of reducing resolution, a device may first reduce the resolution of the original depth map by a factor of two on each axis to obtain a quarter-resolution depth map, and then further reduced by a factor of four on each axis, resulting in $1/64^{th}$ of the original resolution. In other examples, any other suitable resolution reduction process may be used. Further, in some examples, the depth map received may have previously undergone at least some reduction of resolution.

Figure 5:
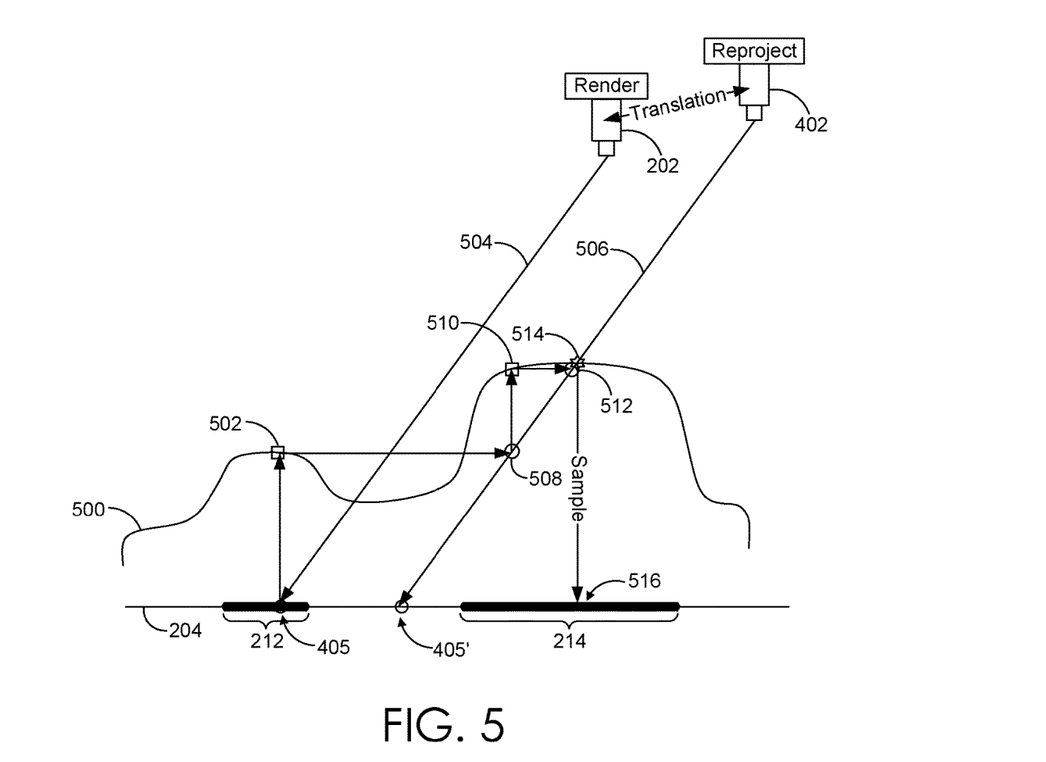
FIG. 5 is an illustration of exemplary successive approximation steps for determining a location and color at a reprojected frame buffer pixel, in accordance with embodiments of the present invention.

FIG. 5 shows a schematic representation of a blurred depth map 500 of 2D scene 200, and illustrates an example method of VDLSR further comprising determining a color to sample for display using blurred depth map 500. Each pixel in frame buffer 204 maps to a corresponding entry in blurred depth map 500. Blurred depth map 500 is depicted as a curved line, where each point on the curved line corresponds to a distance between rendering camera 202 and the nearest 2D object on the ray cast to a corresponding pixel. For example, the square 502 represents the depth value on blurred depth map 500 that corresponds to pixel 405. In addition to blurring, further bounds may be applied on the size of the translation and the distance to the nearest object.

Prior to translational correction and velocity-based motion correction, a rotational correction may be applied. This may be visualized by tilting both the curved line (depth map 500) and the straight line (frame buffer 204) relative to rendering camera 202 based on detected rotational changes in the camera position due to head and/or device movement. Because a rotational correction transforms both the depth map and the frame buffer pixel locations equally, the mapping of each pixel to its corresponding depth value is preserved.

In contrast, as described above, translational correction relies on each pixel's depth entry to determine a translated location from which the device should sample values for the outbound frame buffer. Velocity-based motion correction also relies on each pixel's vector data (e.g., velocity vector) to determine a distance to further correct the location of the pixel through time. Because each blurred depth map entry may correspond to 64 or more pixels, the device interpolates the sampling address based on the pixel address for each pixel. When rendering the original frame buffer, the device relies on the geometry of the 2D scene to determine which 2D object is closest to the rendering camera and thereby contributes the most to the depth value for each pixel. Velocity depth late-stage reprojection performs a similar process, but the depth map is used to infer the color that would have been rendered based on the 2D scene geometry. The GPU or other device performing the reprojection thus determines, for each pixel, where a reprojected ray cast based on the rendering camera extending to a reprojected pixel, translation correction and velocity-based motion correction, intercepts the depth map.

The location at which reprojected ray 506 intersects blurred depth map 500 may be determined using successive approximation for both depth and velocity. Advantageously, the successive approximation can be performed in a single pass. In FIG. 5, the squares represent depth value estimates while the circles represent locations on the reprojected ray corresponding to depth value estimates. First, an initial depth value 502 is determined which corresponds to the original frame buffer location, illustrated as source pixel 405 along original ray 504. Then, an initial location 508 on reprojected ray 506 is determined that corresponds to initial depth value 502. Next, an updated depth value 510 on blurred depth map 500 is determined which corresponds to initial location 508 on reprojected ray 506. Next, an updated location 512 on reprojected ray 506 is determined that corresponds to updated depth value 510. The steps of determining the updated depth value on blurred depth map 500 and determining the updated location on reprojected ray may be iteratively repeated any suitable number of times. In some examples, these steps are repeated a fixed number of times, such that the iterative process is deterministic.

After a suitable or fixed number of iterative cycles, a location 514 at which reprojected ray 506 intersects blurred depth map 500 is determined. The device then samples frame buffer 500 location that corresponds to location 514, at 516 for display. Convergence to location 514 may occur fairly quickly, at least partially as a result of the blurring of the depth map. Where a fixed number of cycles is used, the number of cycles selected may depend upon how quickly the successive approximation is determined to converge to a suitable accuracy. The use of a deterministic fixed number of iterations may be a programmed parameter, and may provide various advantages. For example, the use of a fixed number of cycles helps to control an amount of processing power used for each reprojected frame of image data, and to maintain a consistent data flow through the graphics processing pipeline. In other implementations, the process may utilize a convergence threshold rather than a fixed number of iterations per pixel.

Figure 6:
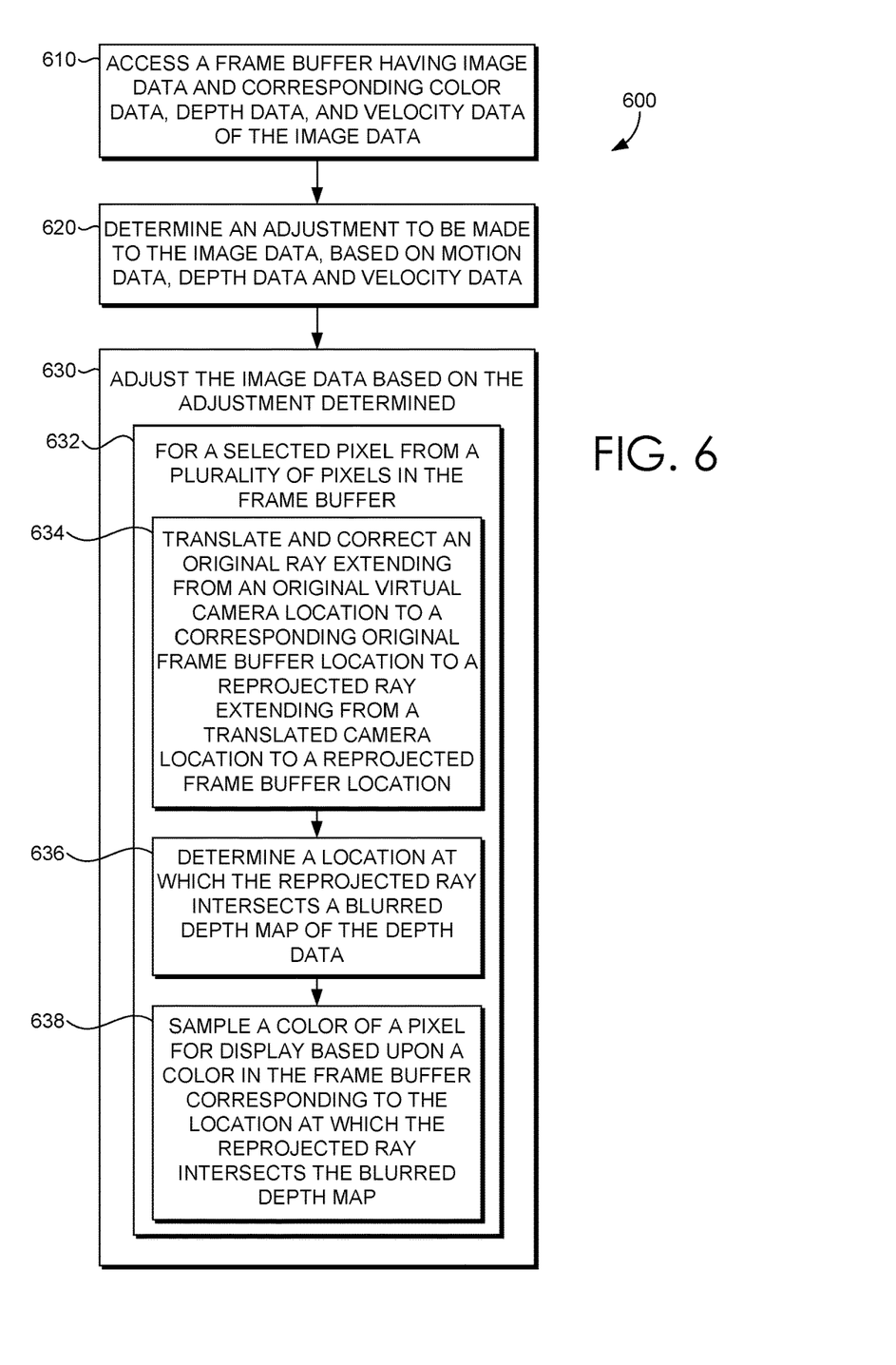
FIG. 6 is a flow diagram showing a method for reprojecting images using velocity depth late stage projection, in accordance with embodiments of the present invention.

With reference to FIG. 6, a method for reprojecting images based on velocity depth late stage projection is provided. The method 600 can be performed using a reprojection engine of the display system described herein. While described in the context of a single frame buffer, in some examples more than one frame buffer may be sampled. Initially at block 610, a frame buffer is accessed. The frame buffer includes image data and corresponding color data, depth data and velocity data of the image data. Such image data may include virtual object and/or images to be displayed for a virtual or augmented reality experience. At block 620, an adjustment to be made to the image data is determined based on motion data, depth data and velocity data. The motion data corresponds to a device associated with displaying the image data. The velocity data support determining calculated correction distances for non-stationary objects in the image data. Determining an adjustment to be made can include determining a rotation, a translation and a velocity-based motion adjustment to the rendered image data.

At block 630, the image data is adjusted based on the adjustment determined. At block 632 for a selected pixel from a plurality of pixels in the frame buffer, the method 600 includes, at block 634, translating and correcting an original ray extending from an original virtual camera location to a corresponding original frame buffer location to a reprojected ray extending from a translated camera location to a reprojected frame buffer location. The method 600 further includes at block 636, based on translating and correcting the original ray, determining a location at which the reprojected ray intersects a blurred depth map of the depth data.

As described herein, this location may be determined via successive approximation. As an example, method 600 may include, determining an initial depth value on the blurred depth map corresponding to the original frame buffer location, and determining an initial location on the reprojected ray corresponding to the initial depth value. Then, method 600 includes, determining an updated depth value on the blurred depth map corresponding to the initial location on the reprojected ray, and determining an updated location on the reprojected ray corresponding to the updated depth value. Method 600 may comprise iteratively repeating the determining of the updated depth value and the determining of the updated location on the reprojected ray until a specified condition is met. For example, determining of the updated depth value and the determining of the updated location on the reprojected ray may be iteratively repeated for a fixed number of times for each pixel in a deterministic manner. In other examples, successive approximation may be carried out in a non-deterministic manner, for example by repeating iterations until a convergence threshold is reached.

At block 638, sampling a color of a pixel for display based upon a color in the frame buffer corresponding to the location at which the reprojected ray intersects the blurred depth map. The method further includes causing display, via a display associated with the device, the image data after translating and correcting the original ray to the reprojected ray. In embodiments, correcting the original ray for the selected pixel is based calculating a corrected distance that indicates a distance moved over a change in time based on the velocity data. In an alternate embodiment, correcting the original ray for the selected pixel is based on identifying a leading silhouette for the pixel within the velocity data in the frame buffer; extending the leading silhouette along a direction of a motion vector associated with the pixel by at least one step; sampling velocity data for the pixel; and multiplying the velocity data by an inter-frame time step such that a pre-rendered position is transformed by the calculated corrected distance in an opposite direction. It is contemplated that adjusting the image data is based on integrating depth data-based translation and velocity-data-based motion correction into a single pass implementation.

Figure 7:
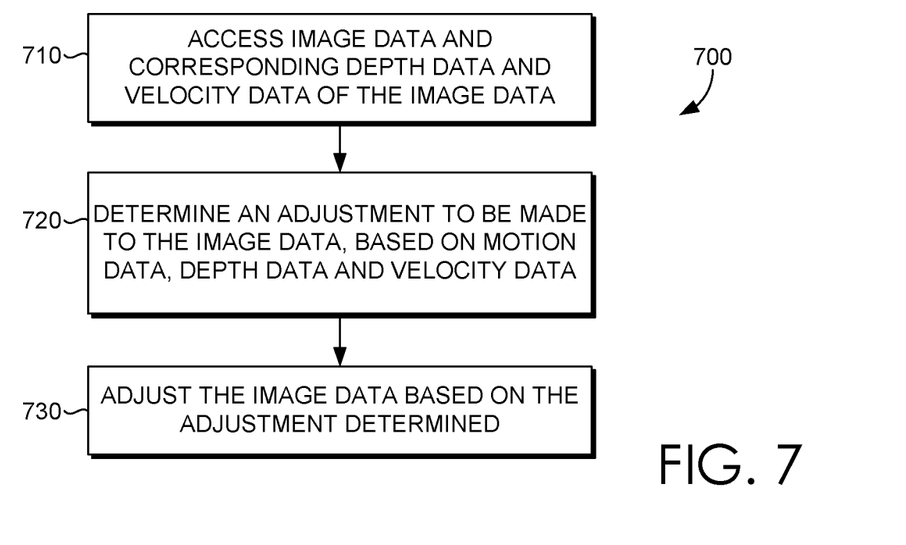
FIG. 7 is a flow diagram showing a method for reprojecting images using velocity depth late stage projection, in accordance with embodiments of the present invention.

With reference to FIG. 7, a method for reprojecting images based on velocity depth late stage projection is provided. The method 700 can be performed using a reprojection engine of the display system described herein. Initially at block 710, image data and corresponding depth data and velocity data of the image data is accessed. At block 720, an adjustment to be made to the image based on motion data, depth data and velocity data is determined. The motion data corresponds to a device associated with displaying the image data. The velocity data support determining calculated correction distances for portions of the image data. At block 730, the image data is adjusted based on the adjustment determined. Adjusting the image data is based on integrating depth data-based translation and velocity-data-based correction.

Figure 8:
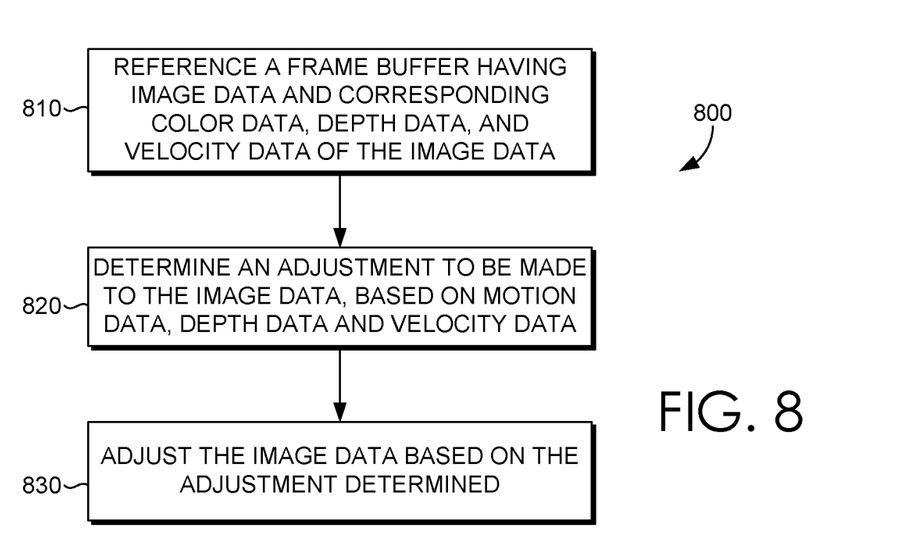
FIG. 8 is a flow diagram showing a method for reprojecting images using velocity depth late stage projection, in accordance with embodiments of the present invention.

With reference to FIG. 8, a method for reprojecting images based on velocity depth late stage projection is provided is provided. The method 800 can be performed using the reprojection engine of the display system described herein. A computer storage medium can include computer-executable instructions that when executed by a processor causes the processor to perform the method 800. Initially at block 810, image data and corresponding color data, depth data and velocity data of the image data is referenced from a frame buffer. The image data comprising station and non-station objects. At block 820, an adjustment to be made to the image based on motion data, depth data and velocity data is determined. The motion data corresponds to a device associated with displaying the image data. The velocity data support determining calculated correction distances for portions of the image data. At block 830, the image data is adjusted based on the adjustment determined. Adjusting the image data is based on integrating depth data-based translation and velocity-data-based correction.

An exemplary device display that can be controlled based on velocity depth late stage reprojection (VDLSR) is an augmented reality device. An augmented reality device can support the presentation of augmented reality images. Augmented reality images include augmented reality objects, which are virtualized objects or entities (e.g., holographic content or mixed-reality content), that are rendered for a user associated with the augmented reality device. As used herein, augmented reality is a type of virtual reality and embodiments described herein are contemplated for implementation in virtual reality or augmented reality. In particular, the augmented reality objects can be rendered based on a real world environment, where the real world environment can be captured in a digital representation by the augmented reality device. Understanding the real world environment can be based on several different techniques that provide the augmented reality device with information about the environment. For example, an environment can be scanned in real-time and a mesh representation of the environment can be dynamically generated to provide the augmented reality device with information about the environment.

As such, augmented reality devices can support augmented reality or mixed-reality experiences. Such experiences include navigating through real world environments based on augmented reality objects or viewing augmented reality objects ("AR objects") in combination with the real world environment. AR objects can include a hologram catalogue of 3D objects or virtual images that can be placed and scaled around a user. AR objects can be used in a variety of different implementations (e.g., video games, entertainment, productivity tools, etc.) as entities that can be controlled through a graphical user interface from actuators from the user via the mixed-input pointing device described herein.

Figure 1:
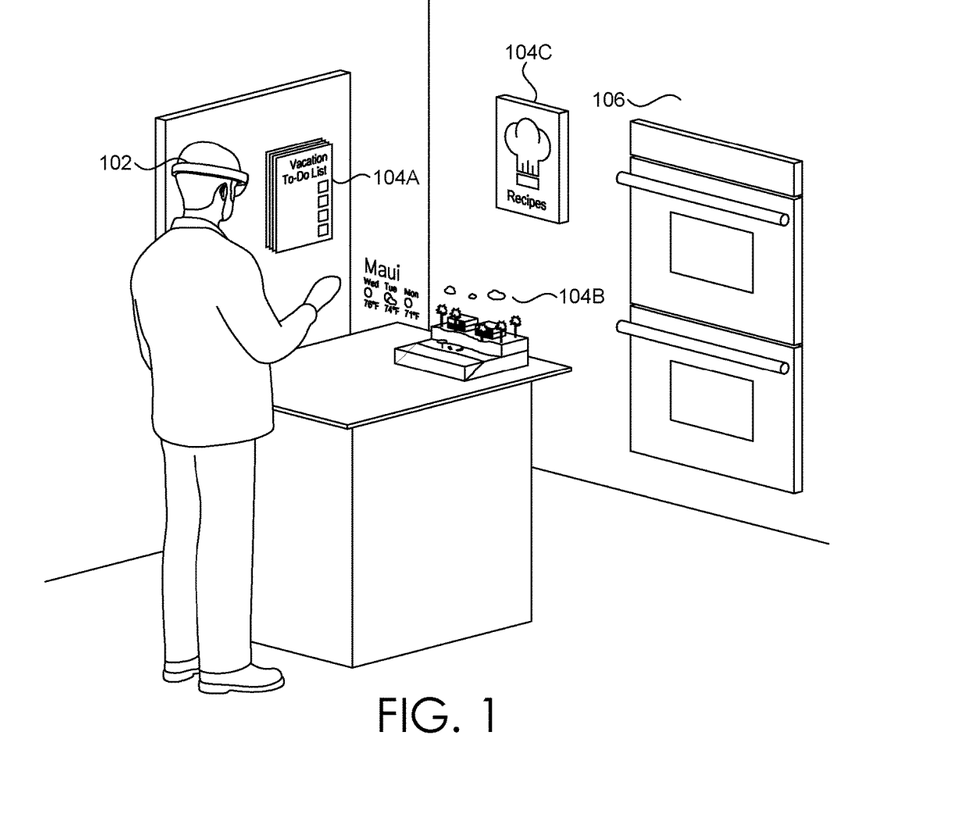
FIG. 1 is an illustrated diagram showing exemplary augmented reality images of a head-mounted display device, in accordance with embodiments of the present invention.

With reference to FIG. 1, exemplary images of a head-mounted display (HMD) device 102 are depicted. Augmented reality images (e.g., 104A, 104B and 104C), comprising corresponding virtual images provided by the HMD 102 device, generally include the virtual images that appear superimposed on a background 106 and may appear to interact with or be integral with the background 106. The background 106 is comprised of real-world scene, e.g., a scene that a user would perceive without an augmented reality image emitted by the HMD 102 device. For example, an augmented reality image can include the recipe book icon 104C that appears superimposed and hanging in mid-air in front of the cooking oven or wall of the background 106. Then, as the user moves within the room, image data and/or other motion data (e.g. inertial measurement unit (IMU) data) may be used to update the position of the device with respect to the augment reality images objects 104A, 104B and 104C, and thereby update the displayed position of virtual objects 104A, 104B and 104C as appropriate.

Figure 9:
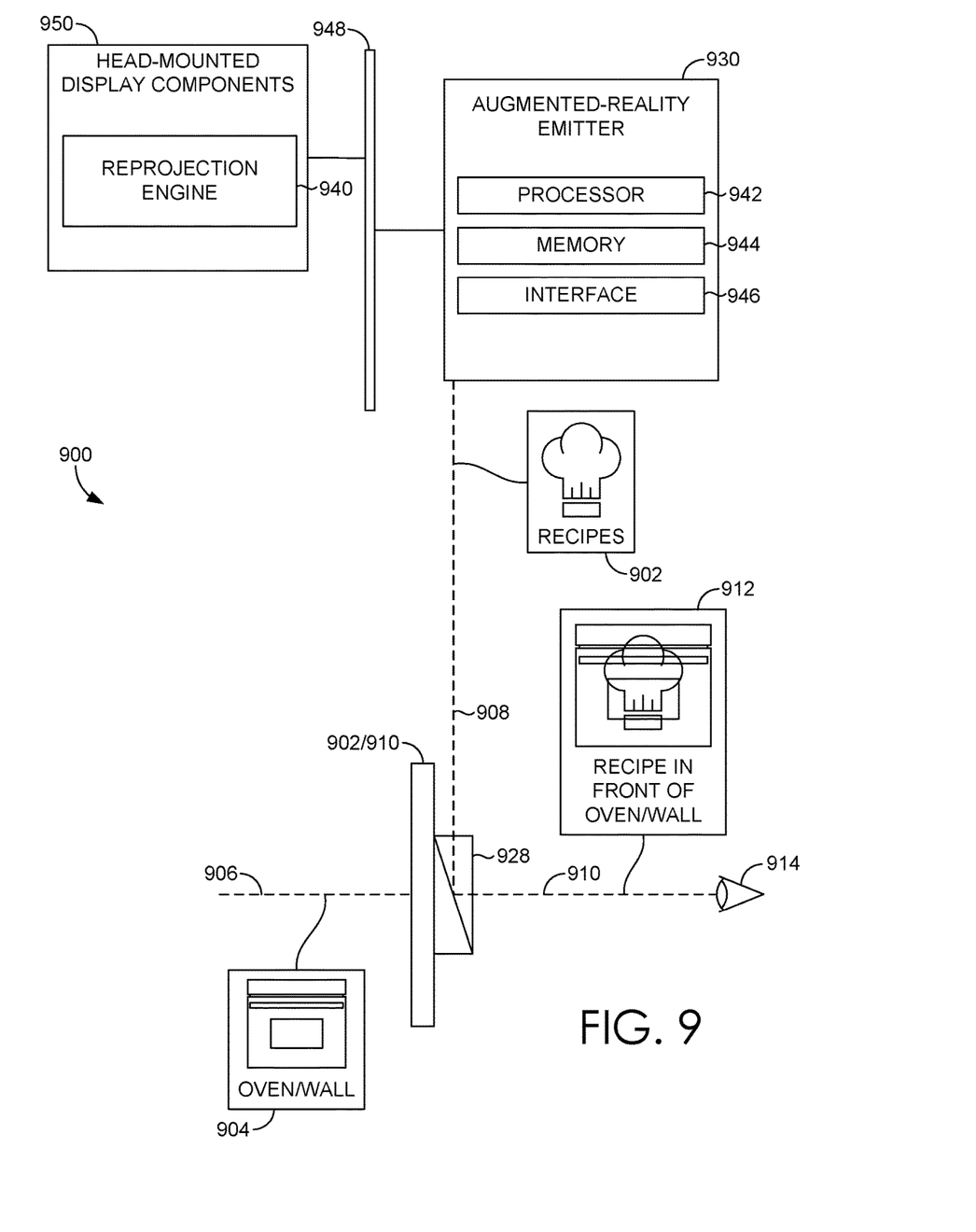
FIG. 9 is a block diagram of an exemplary head-mounted display device, in accordance with embodiments of the present invention.

With reference to the display system 900, embodiments described herein support reprojecting images based on velocity depth late stage projection. The display system components refer to integrated components for reprojecting images. The integrated components refer to the hardware architecture and software framework that support data access functionality using the display system. The hardware architecture refers to physical components and interrelationships thereof and the software framework refers to software providing functionality that can be implemented with hardware embodied on a device. The end-to-end software-based display system can operate within the display system components to operate computer hardware to provide display system functionality. As such, the display system components can manage resources and provide services for the display system functionality. Any other variations and combinations thereof are contemplated with embodiments of the present invention.

By way of example, the display system can include an API library that includes specifications for routines, data structures, object classes, and variables may support the interaction between the hardware architecture of the device and the software framework of the display system. These APIs include configuration specifications for the display system such that the different components therein can communicate with each other in the display system, as described herein.

Turning to FIG. 9, the display system 900 includes the HMD device 902 having the reprojection engine 940 described in accordance with an embodiment described herein. The HMD device 902 includes a see-through lens 910 which is placed in front of a user's eye 914, similar to an eyeglass lens. It is contemplated that a pair of see-through lenses 910 can be provided, one for each eye 914. The lens 910 includes an optical display component 928, such as a beam splitter (e.g., a half-silvered mirror). The HMD device 902 includes an augmented reality emitter 930 that facilitates projecting or rendering the of augmented reality images. Amongst other components not shown, the HMD device also includes a processor 942, memory 944, interface 946, a bus 948, and additional HMD components 950. The augmented reality emitter 930 emits light representing a virtual image 902 exemplified by a light ray 908. Light from the real-world scene 904, such as a light ray 906, reaches the lens 910. Additional optics can be used to refocus the virtual image 902 so that it appears to originate from several feet away from the eye 914 rather than one inch away, where the display component 928 actually is. The memory 944 can contain instructions which are executed by the processor 942 to enable the augmented reality emitter 930 to perform functions as described. One or more of the processors can be considered to be control circuits. The augmented reality emitter communicates with the additional HMD components 950 using the bus 948 and other suitable communication paths.

Light ray representing the virtual image 902 is reflected by the display component 928 toward a user's eye, as exemplified by a light ray 910, so that the user sees an image 912. In the augmented-reality image 912, a portion of the real-world scene 904, such as, a cooking oven is visible along with the entire virtual image 902 such as a recipe book icon. The user can therefore see a mixed-reality or augmented-reality image 912 in which the recipe book icon is hanging in front of the cooking oven in this example.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Embodiments of the present disclosure can be discussed with reference to an exemplary display system 900 in which implementations of the present disclosure may be employed. FIG. 9 shows a high level architecture of the display system 900 having an infrastructure and communicating using components in accordance with implementations of the present disclosure. The display system 900 specifically includes the reprojection engine 940. A system as used herein refers to any device, process, or service or combination thereof. A system may be implemented using components as hardware, software, firmware, a special-purpose device, or any combination thereof. A system may be integrated into a single device or it may be distributed over multiple devices. The various components of a system may be co-located or distributed. The system may be formed from other system and components thereof. The components of the thumbnail object generation system facilitate generating thumbnail object based on thumbnail anchor points.

Having identified various components of the display system 900, it is noted that any number of components may be employed to achieve the desired functionality within the scope of the present disclosure. The various components of FIG. 9 are shown with lines for the sake of clarity. Further, although some components of FIG. 9 are depicted as single components, the depictions are exemplary in nature and in number and are not to be construed as limiting for all implementations of the present disclosure. The display system 900 functionality can be further described based on the functionality and features of the above-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 10:
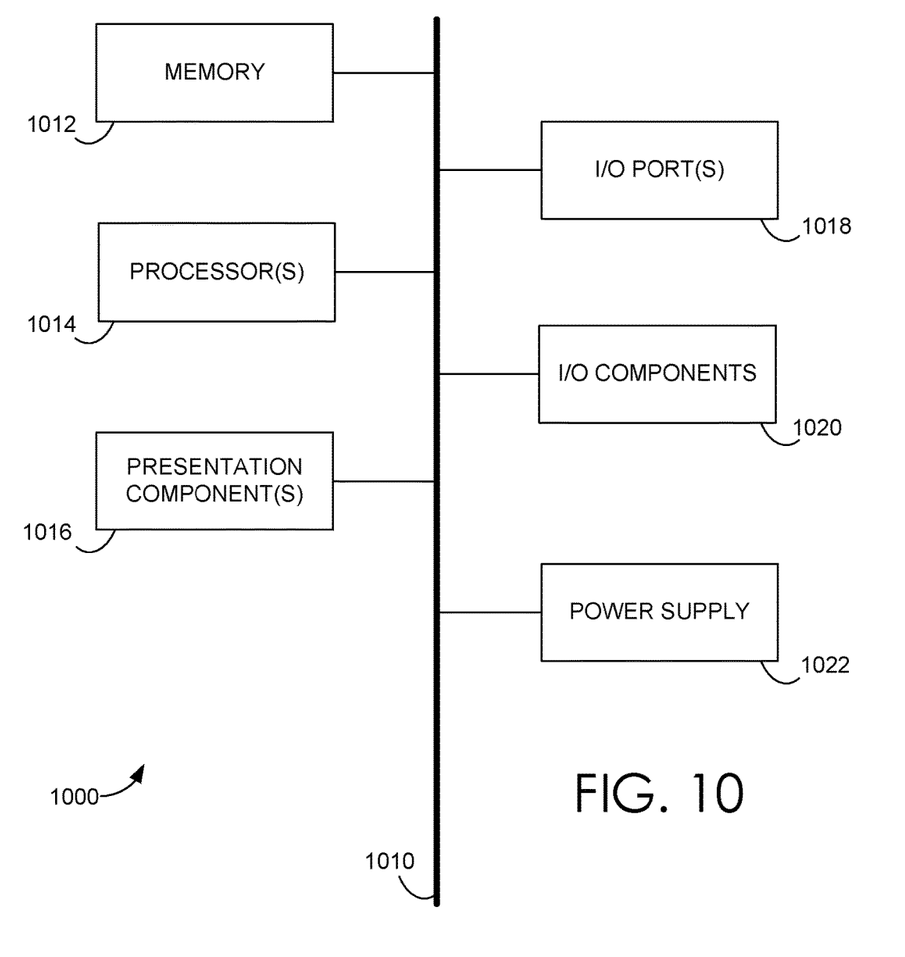
FIG. 10 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 10 in particular, an exemplary operating environment for implementing embodiments of the present invention is shown and designated generally as computing device 1000. Computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types.

The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 10, computing device 1000 includes a bus 1010 that directly or indirectly couples the following devices: memory 1012, one or more processors 1014, one or more presentation components 1016, input/output ports 1018, input/output components 1020, and an illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 10 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the display system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for reprojection virtual images based on velocity and depth late stage reprojection, the system comprising:
one or more processors and memory configured for providing computer program instructions to the one or more processors;
a reprojection engine configured to:
access a frame buffer having image data and corresponding color data, depth data, and velocity data of the image data, wherein the image data comprises stationary objects and non-stationary objects;
determine an adjustment to be made to the image data, based on motion data, depth data and velocity data, the motion data corresponding to a device associated with displaying the image data, the velocity data supports determining calculated correction distances for non-stationary objects in the image data; and
adjusting the image data based on the adjustment determined, wherein for a selected pixel from a plurality of pixels in the frame buffer:
translating and correcting an original ray extending from an original virtual camera location to a corresponding original frame buffer location to a reprojected ray extending from a translated camera location to a reprojected frame buffer location;
based on translating and correcting the original ray, determining a location at which the reprojected ray intersects a blurred depth map of the depth data; and
sampling a color of a pixel for display based upon a color in the frame buffer corresponding to the location at which the reprojected ray intersects the blurred depth map.

2. The system of claim 1, wherein the reprojection engine is further configured to determine the location at which the reprojected ray intersects the blurred depth map is based on:
determining an initial depth value on the blurred depth map corresponding to the original frame buffer location,
then determining an initial location on the reprojected ray corresponding to the initial depth value;
then determining an updated depth value on the blurred depth map corresponding to the initial location on the reprojected ray; and
then determining an updated location on the reprojected ray corresponding to the updated depth value.

3. The system of claim 2, wherein the reprojection engine is further configured to determine the location at which the reprojected ray intersects the blurred depth map by iteratively repeating the determining of the updated depth value and the determining of the updated location on the reprojected ray.

4. The system of claim 2, wherein the reprojection engine is further configured to cause display via a display associated with the device the image data after translating and correcting the original ray to the reprojected ray.

5. The system of claim 1, wherein correcting the original ray for the selected pixel is based on calculating a corrected distance that indicates a distance moved over a change in time based on the velocity data.

6. The system of claim 1, wherein correcting the original ray for the selected pixel is based on:
identifying a leading silhouette for the pixel within the velocity data in the frame buffer;
extending the leading silhouette along a direction of a motion vector associated with the pixel by at least one step;
sampling velocity data for the pixel; and
multiplying the velocity data by an inter-frame time step such that a pre-rendered position is transformed by a calculated corrected distance in an opposite direction.

7. The system of claim 1, wherein adjusting the image data is based on integrating depth data-based translation and velocity-data-based motion correction into a single pass implementation.

8. A computer-implemented method for reprojecting virtual images based on velocity and depth late stage reprojection, the method comprising:
accessing image data and corresponding depth data and velocity data of the image data;
determining an adjustment to be made to the image data, based on motion data, depth data and velocity data, the motion data corresponding to a device associated with displaying the image data, the velocity data supports determining calculated correction distances for portions of the image data; and
adjusting the image data based on the adjustment determined, wherein adjusting the image data is based on integrating depth data-based translation and velocity-data-based motion correction.

9. The method of claim 8, wherein adjusting the image data is based on:
translating and correcting an original ray extending from an original virtual camera location to a corresponding original frame buffer location to a reprojected ray extending from a translated camera location to a reprojected frame buffer location;
based on translating and correcting the original ray, determining a location at which the reprojected ray intersects a blurred depth map of the depth data; and
sampling a color of a pixel for display based upon a color in a frame buffer corresponding to the location at which the reprojected ray intersects the blurred depth map.

10. The method of claim 9, wherein determining the location at which the reprojected ray intersects the blurred depth map comprises:
determining an initial depth value on the blurred depth map corresponding to the original frame buffer location;
then determining an initial location on the reprojected ray corresponding to the initial depth value;
then determining an updated depth value on the blurred depth map corresponding to the initial location on the reprojected ray; and
then determining an updated location on the reprojected ray corresponding to the updated depth value.

11. The method of claim 10, wherein determining the location at which the reprojected ray intersects the blurred depth map comprises iteratively repeating the determining of the updated depth value and the determining of the updated location on the reprojected ray.

12. The method of claim 9, wherein correcting the original ray for the selected pixel is based on calculating a corrected distance that indicates a distance moved over a change in time based on the velocity data.

13. The method of claim 9, wherein correcting the original ray for the selected pixel is based on:
identifying a leading silhouette for the pixel within the velocity data in the frame buffer;
extending the leading silhouette along a direction of a motion vector associated with the pixel by at least one step;
sampling velocity data for a pixel; and multiplying the velocity data by an inter-frame time step such that a pre-rendered position is transformed by the calculated corrected distance in an opposite direction.

14. The method of claim 8, further comprising displaying via a display associated with the device the image data after adjusting the image data.

15. One or more computer storage media having computer-executable instructions embodied thereon that, when executed, by one or more processors, causes the one or more processors to perform a method for reprojecting images based on velocity and depth late stage reprojection, the method comprising:

referencing a frame buffer having image data and corresponding color data, depth data, and velocity data of the image data, wherein the image data comprises stationary objects and non-stationary objects;

determining an adjustment to be made to the image data, based on motion data, depth data and velocity data, the motion data corresponding to a device associated with displaying the image data, the velocity data supports determining calculated correction distances for non-stationary objects in the image data; and adjusting the image data based on the adjustment determined, wherein adjusting the image data is based on integrating depth data-based translation and velocity-data-based motion correction.

16. The media of claim 15, wherein reprojecting the image data, for a selected pixel from a plurality of pixels in the frame buffer, is based on:

translating and correcting an original ray extending from an original virtual camera location to a corresponding original frame buffer location to a reprojected ray extending from a translated camera location to a reprojected frame buffer location;

based on translating and correcting the original ray, determining a location at which the reprojected ray intersects a blurred depth map of the depth data; and sampling a color of a pixel for display based upon a color in the frame buffer corresponding to the location at which the reprojected ray intersects the blurred depth map.

17. The media of claim 15, wherein determining the location at which the reprojected ray intersects the blurred depth map is based on:

determining an initial depth value on the blurred depth map corresponding to the original frame buffer location, then determining an initial location on the reprojected ray corresponding to the initial depth value;

then determining an updated depth value on the blurred depth map corresponding to the initial location on the reprojected ray; and then determining an updated location on the reprojected ray corresponding to the updated depth value.

18. The media of claim 17, wherein determining the location at which the reprojected ray intersects the blurred depth map comprises iteratively repeating the determining of the updated depth value and the determining of the updated location on the reprojected ray.

19. The media of claim 16, wherein correcting the original ray for the selected pixel is based on calculating a corrected distance that indicates a distance moved over a change in time based on the velocity data.

20. The media of claim 16, wherein correcting the original ray for the selected pixel is based on:

identifying a leading silhouette for the pixel within the velocity data in the frame buffer;

extending the leading silhouette along a direction of a motion vector associated with the pixel by at least one step;

sampling velocity data for a pixel; and multiplying the velocity data by an inter-frame time step such that a pre-rendered position is transformed by the calculated corrected distance in an opposite direction.

* * * * *